No. 857,883. PATENTED JUNE 25, 1907.
J. D. KREISSER.
ARTIFICIAL MINNOW FISHING BAIT.
APPLICATION FILED JAN. 8, 1906.

Witnesses
George H. Ricke
Geo. E. Heisel

Inventor
John D. Kreisser
by Attorney

UNITED STATES PATENT OFFICE.

JOHN D. KREISSER, OF CINCINNATI, OHIO.

ARTIFICIAL-MINNOW FISHING-BAIT.

No. 857,883.    Specification of Letters Patent.    Patented June 25, 1907.

Application filed January 8, 1906. Serial No. 295,042.

*To all whom it may concern:*

Be it known that I, JOHN D. KREISSER, a citizen of United States, residing at Cincinnati, in the county of Hamilton and State of Ohio, have invented certain new and useful Improvements in Artificial-Minnow Fishing-Bait, of which the following is a specification.

The object of my invention is to produce a cheap, simple and efficient bait for fishing purposes. It belongs to that class of bait used to catch game fish, such as bass, pike and the like. It is artificial in construction but in use imitates the natural and becomes animated in its action.

It consists essentially in producing an artificial animated minnow, made of independent separate sections, movably jointed together. A further advantage consists in providing a weight in the minnow head, so that it will balance in the water and lie in a horizontal position, just like a live minnow. Another advantage consists in providing a flared tail. A minnow constructed with these features will move in the water as if in animation and thus simulate life.

Artificial bait as now used, must be handled by an experienced fisherman, as it must be trolled properly or cast in such a perfect and technical manner, that it will strike the water in such a manner that it can be reeled in properly and assume the proper position in the water. It cannot be used for still fishing at all, as it would fall to the bottom.

My new animated minnow overcomes any objections made to the artificial bait now used and simplifies the art of fishing and gives to it a uniform and standard bait; inasmuch as it is easily used for trolling, readily cast, and can be used in still fishing with the ordinary line and pole, with or without a cork or bob, and either in trolling, casting or still fishing, the animated minnow instantly and accurately adjusting itself in the water to imitate a live minnow.

Figure 1:
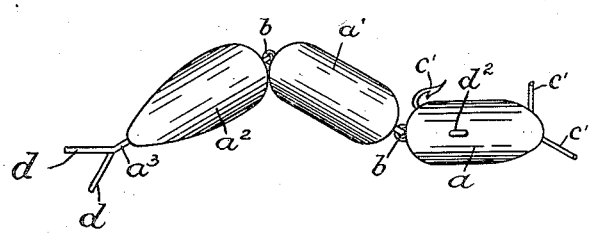
Figure 2:
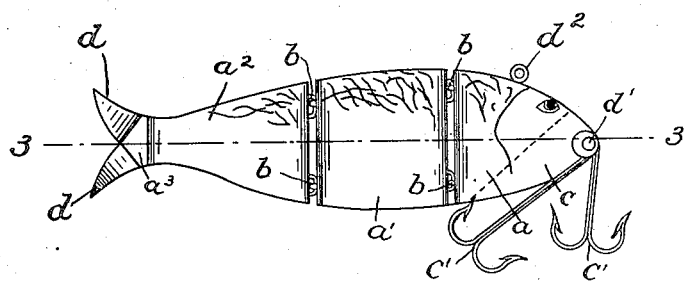
Figure 3:
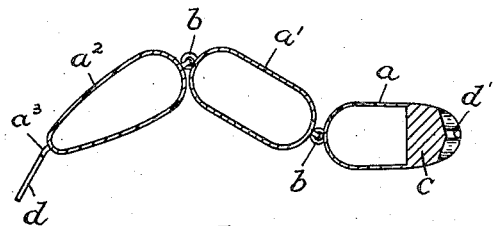

In the accompanying drawing forming part of this specification. Figure 1 is a view in elevation of my new animated minnow Fig. 2 a top or plan view of the minnow and Fig. 3 is a sectional view of the minnow.

The minnow is composed of sections, pivotally, loosely jointed or movably connected together. While the sections may be shaped and constructed in different ways, I prefer to make each piece or section independent and separate and then connect them together so that they will swing or move laterally in the water to simulate life.

In the present specific instance, the minnow is composed of sections $a$ $a^1$ $a^2$ and $a^3$, section $a$ being the head of the minnow, sections $a^1$ and $a^2$ the body thereof and $a^3$ the tail. These sections are preferably made of thin copper, hollow and shaped to imitate that part of the live minnow, which they are supposed to represent. These sections are jointed or loosely connected by means of eyelets $b$, the eyelets of one section fitting into the eyelets of the adjacent section. As many of these eyelets $b$ may be used as is found desirable. In the present instance the tail piece $a^3$ is made integral with section $a^2$.

The head or section $a$ is provided with a weight as $c$, made of any desired material and made of any shape, size and contour, but preferably to represent part of the head of a natural minnow. This weight balances the minnow in the water and holds it in a normal and horizontally natural position, the same as a live minnow.

The tail or section $a^3$ is usually made of one flat piece, having its points or ends $d$ $d$ flared, one to the right and one to the left. This tail is flared so that in the water the bait will more readily simulate life.

A ring $d^1$ may be placed in the nose of the fish and a ring $d^2$ at the top of the head; they may however be placed in any other position. To these rings the fishing line is attached in trolling, casting or still fishing, as may be the case.

Hooks or sets of hooks as $c^1$ may be disposed at suitable parts on the minnow, they however being so placed as to best snare the fish when a strike is made.

The minnow is usually colored dark on its back and light underneath to make it appear like a live minnow. It may be, however, colored as desired.

In use, the artificial minnow is placed at the end of a line and trolled or pulled through the water from a boat or skiff, the action and pressure of the water, will force the minnow to move and thrust just as if it were alive; this naturally will insure a strike from the bass or other fish very readily, as the bass is not only allured, but also believes he is striking at a live minnow for food, thus doubly insuring a catch. In casting, the same effect is produced, the artificial minnow as soon as it strikes the water assuming a natural position and as it is reeled in, again doubly insures a catch. It is also very efficient in still fishing, as the waves or movement of the water or the current, or the wind striking the line, cork or bob produces animation in the minnow and the fish will strike at it or attempt to use it for food and be caught readily.

It will thus be seen that my animated minnow can be used in any kind of waters, in any manner or style of fishing and act as a live minnow.

By the use of my animated minnow, the alluring devices, spinning and rotating spoons and other artificial bait now used in game fishing and the live minnow itself are all dispensed with as my animated minnow combines the advantages of them all in a perfect bait.

The minnow may be made of any desired shape or size, of any contour, shape or configuration and out of any material. It may be made of any number of sections, two or more and if desired the tail piece may be jointed permanently to the next section.

The weight may be used in any manner and attached to minnow in any desired way.

The sections may be formed, stamped, molded, or spun in any size, form or shape and be connected together in any suitable, practical and desirable manner, so long as the proper degree of animation is present.

What I claim as new and of my invention and desire to secure by Letters Patent is:—

1. In a fishing bait of the character described, being an artificial minnow composed of independent separate sections, the sections being movably joined together, so that when the minnow bait is in the water it will simulate life, as and for the purposes set forth.

2. In a fishing bait of the character described, being an artificial minnow composed of independent separate hollow sections, said sections being movably joined together, so that when the minnow bait is in the water it will simulate life, as set forth.

3. In a fishing bait of the character described, being an artificial minnow composed of independent separate sections, movably joined together, in combination with a laterally flaring tail piece, as and for the purposes set forth.

4. In a fishing bait of the character described, a series of independent separate sections, said sections forming an artificial minnow, means interposed between the said sections for rendering them laterally movable in the water to simulate life without the use of extraneous means.

5. In a fishing bait of the character described, formed of independent separate movably joined sections, adapted to simulate life under water by assuming a wriggling motion, and means for holding the bait in a horizontal position in the water, as and for the purposes set forth.

6. In an artificial bait of the character described, being an artificial minnow composed of independent separate movably joined sections, in combination with a bifurcated tail, the forks of which diverge, as and for the purposes set forth.

7. A fishing bait of the character described, being an artificial minnow, said minnow composed of a series of sections, movably joined together, a weight, said weight made integral with the head section of the minnow, and a flared tail piece, as and for the purposes set forth.

8. A bait of the character described, being an artificial minnow composed of a series of sections, said sections joined together by eyes, the eyes of one section fitting the eyes of the adjacent section, so that the sections are movable, said sections being hollow, the head section carrying a weight and the tail section being flared, all combined and operating as set forth.

In testimony whereof I affix my signature in presence of two witnesses.

JOHN D. KREISSER.

Witnesses:
CLARENCE T. BLACK,
JOHN W. STREHLI.